United States Patent
Sewell et al.

(10) Patent No.: US 9,249,340 B2
(45) Date of Patent: Feb. 2, 2016

(54) METHODS AND SYSTEMS FOR REMOVABLY COUPLING CONSUMABLE PARTS WITHIN A SYSTEM

(75) Inventors: Terry A. Sewell, Ballwin, MO (US); Carlos Angelo Fracchia, Ballwin, MO (US)

(73) Assignee: THE BOEING COMPANY, Chicago, IL (US)

( * ) Notice: Subject to any disclaimer, the term of this patent is extended or adjusted under 35 U.S.C. 154(b) by 612 days.

(21) Appl. No.: 13/092,605

(22) Filed: Apr. 22, 2011

(65) Prior Publication Data
US 2012/0267414 A1 Oct. 25, 2012

(51) Int. Cl.
*C09J 5/00* (2006.01)

(52) U.S. Cl.
CPC *C09J 5/00* (2013.01); *Y10T 156/10* (2015.01); *Y10T 156/1002* (2015.01); *Y10T 225/30* (2015.04)

(58) Field of Classification Search
USPC ......... 403/265, 270; 156/70, 247, 297, 304.3, 156/701, 718; 428/157, 172, 192
See application file for complete search history.

(56) References Cited

U.S. PATENT DOCUMENTS

| | | | |
|---|---|---|---|
| 2,561,375 A | 7/1951 | Ingels | |
| 2,583,669 A * | 1/1952 | Santina | 220/280 |
| 3,469,766 A | 9/1969 | Nelson | |
| 3,501,797 A * | 3/1970 | Nappi | 15/215 |
| 3,567,108 A * | 3/1971 | Corridon | 229/117.23 |
| 4,193,211 A | 3/1980 | Dotsko | |
| 4,299,639 A * | 11/1981 | Bayer | 156/104 |
| 4,399,602 A * | 8/1983 | Hancock et al. | 29/426.4 |
| 4,567,704 A * | 2/1986 | Bernett et al. | 52/309.3 |
| 4,581,276 A * | 4/1986 | Kunert et al. | 428/157 |
| 4,704,175 A | 11/1987 | Kunert et al. | |
| 4,795,035 A * | 1/1989 | Kim | 229/310 |
| 4,838,429 A * | 6/1989 | Fabisiewicz et al. | 383/205 |
| 4,910,071 A * | 3/1990 | Kunert | 428/192 |
| 4,924,034 A * | 5/1990 | Truesdale et al. | 174/87 |
| 4,933,032 A * | 6/1990 | Kunert | 156/108 |
| 5,057,354 A * | 10/1991 | Kunert et al. | 428/192 |
| 5,116,140 A * | 5/1992 | Hirashima | 383/206 |
| 5,186,807 A | 2/1993 | Sanford et al. | |
| 5,458,720 A * | 10/1995 | Schuyler | 156/290 |
| 5,620,794 A * | 4/1997 | Burkart et al. | 428/343 |

(Continued)

FOREIGN PATENT DOCUMENTS

| | | |
|---|---|---|
| DE | 3933332 A1 | 10/1986 |
| JP | 56028261 A | 3/1981 |

OTHER PUBLICATIONS http://www.merriam-webster.com/dictionary/tile, May 20, 2015.*

(Continued)

*Primary Examiner* — Michael P Ferguson
*Assistant Examiner* — Daniel Wiley
(74) *Attorney, Agent, or Firm* — Armstrong Teasdale LLP

(57) ABSTRACT

A layer of adhesive is applied along a separation interface defined between a first surface of a first component and a second surface of a second component. A first portion of a pull cord is embedded into the adhesive layer along the separation interface and between the first and second surfaces. The first portion of the pull cord is positioned to enable the separation interface to be cleaved such that the first component is uncoupled from the second component. A second portion of the pull cord extends externally to the adhesive layer.

11 Claims, 2 Drawing Sheets

(56) References Cited

U.S. PATENT DOCUMENTS

| | | | | |
|---|---|---|---|---|
| 5,806,257 | A | * | 9/1998 | Cornils et al. .................. 52/208 |
| 7,250,206 | B2 | * | 7/2007 | Orten et al. ................... 428/172 |
| 7,399,018 | B1 | * | 7/2008 | Khachaturian ................ 294/74 |
| 7,549,784 | B1 | * | 6/2009 | Teeters .......................... 362/576 |
| 7,673,788 | B2 | * | 3/2010 | Calabretta ..................... 229/239 |

OTHER PUBLICATIONS

GB Combined Search and Examination Report for Application No. GB1207066.0; Aug. 14, 2012; 5 pages.

Examination Report of GB1207066; Sep. 24, 2013; 7 pages.

\* cited by examiner

METHODS AND SYSTEMS FOR REMOVABLY COUPLING CONSUMABLE PARTS WITHIN A SYSTEM

BACKGROUND

The present disclosure relates generally to consumable and/or refurbishable parts and, more particularly, to methods and systems used to removably couple a consumable part within a system.

Known systems generally require routine maintenance, including scheduled inspections and/or repair of various components. To perform at least some known maintenance actions, the system may be required to be removed from service. Components may be removed from the system for a variety of reasons including, without limitation, component maintenance and/or component failure.

Removing and/or replacing a component may be tedious and/or time-consuming. For example, to remove at least some known components, an adhesive coupling used to couple the component within the system must be manually removed at the component/system interface. After the adhesive is removed from the component system interface via a scraping action, for example, a surface of the system adjacent to the component/system interface must also be cleaned to prepare the surface for a replacement component while an area surrounding the surface is protected. During such a maintenance procedure, the replacement component is coupled to the prepared surface using an adhesive bond, and the replacement component is then re-inspected to ensure that the component/system interface complies with predetermined system specifications. Accordingly, at least some known replacement methods require a long clean up time, a long surface preparation time, and/or a long bonding cycle, all of which may lengthen an overall time that the system is out of service and/or unavailable.

BRIEF DESCRIPTION

In one aspect, a method is provided for coupling a first component having a first surface to a second component having a second surface. The method includes applying a layer of adhesive along a separation interface defined between the first surface and the second surface. A first portion of a pull cord is embedded into the adhesive layer along the separation interface and between the first and second surfaces. The first portion is positioned to enable the separation interface to be cleaved such that the first component is uncoupled from the second component. A second portion of the pull cord extends externally to the adhesive layer.

In another aspect, a pull cord is provided for use in uncoupling a first component having a first surface from a second component having a second surface. A layer of adhesive is applied along a separation interface defined between the first surface and the second surface. The pull cord includes a first portion that is embedded into the adhesive layer along the separation interface and between the first and second surfaces. The first portion is positioned to enable the separation interface to be cleaved. A second portion of the pull cord extends externally to the adhesive layer.

In yet another aspect, a system is provided. The system includes a first component having a first surface, and a second component having a second surface. A separation interface is defined between the first surface and the second surface. A layer of adhesive is applied along the separation interface. A pull cord includes a first portion and a second portion. The first portion is embedded into the adhesive layer along the separation interface and between the first and second surfaces. The first portion is positioned to enable the separation interface to be cleaved such that the first component is uncoupled from the second component. The second portion extends externally to the adhesive layer.

The features, functions, and advantages described herein may be achieved independently in various embodiments of the present disclosure or may be combined in yet other embodiments, further details of which may be seen with reference to the following description and drawings.

Although specific features of various embodiments may be shown in some drawings and not in others, such illustrations are for convenience only. Any feature of a drawing may be referenced and/or claimed in combination with any feature of any other drawing.

DETAILED DESCRIPTION

The subject matter described herein relates generally to consumable and/or refurbishable parts and, more particularly, to methods and systems for use in removably coupling a consumable part within a system such that a bond line may be sheared to facilitate easily removing the consumable part from the system in a quick and efficient manner. In one embodiment, a quick-cure silicone adhesive is used to bond the consumable part to the system. In such an embodiment, the consumable part is quickly detachable from the system using a braided cord. More specifically, in such an embodiment, the braided cord is embedded in the adhesive along the bond line to enable a user to easily separate the component from the system by shearing the bond line using the braided cord.

While the following description references an aircraft, it should be appreciated that the subject matter described herein may be applicable to consumable parts that may be removably coupled within any system. For example, the subject matter described herein could be applicable to components of any other vehicle or machine that includes consumable parts. Accordingly, any reference to "aircraft" throughout the following description is merely meant to illustrate one potential application of the teachings of the subject matter described herein.

As used herein, the term "consumable part" refers to any component that is capable of being destroyed, dissipated, wasted, and/or spent. More specifically, a consumable part is a component that may be "used up" over time such as, without limitation, thermal protection tiles, environment access panels, and/or environment fairings. Additionally, as used herein, the term "cleave" refers to splitting and/or dividing a first surface from a surface along a line of division, i.e., along a bond line.

An element or step recited in the singular and proceeded with the word "a" or "an" should be understood as not excluding plural elements or steps unless such exclusion is explicitly recited. Moreover, references to "one embodiment" of the present invention and/or the "exemplary embodiment" are not intended to be interpreted as excluding the existence of additional embodiments that also incorporate the recited features.

Figure 1:
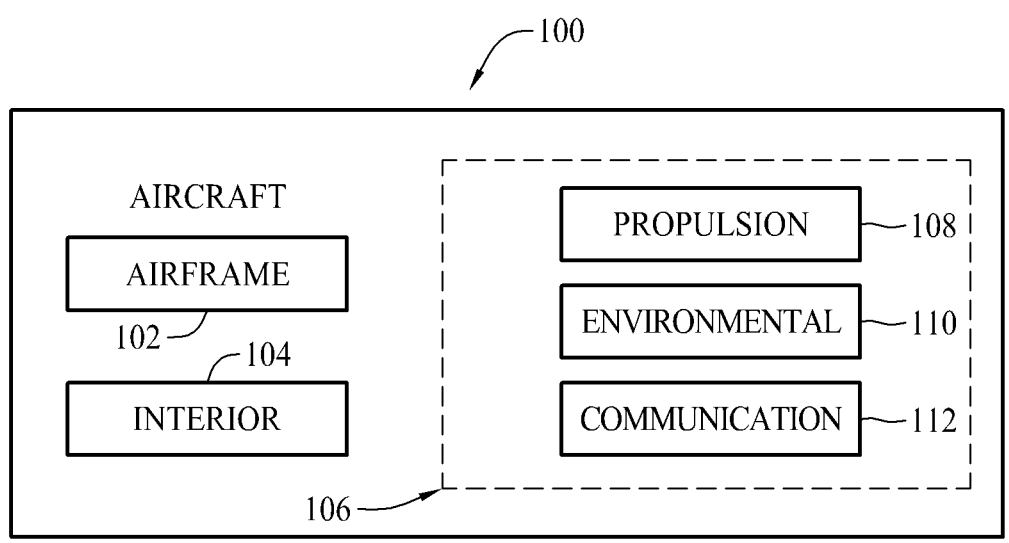
FIG. 1 is a schematic illustration of an exemplary aircraft including a plurality of components.

FIG. 1 illustrates an exemplary aircraft 100 that includes an airframe 102, an interior 104, and a plurality of operational systems 106. In the exemplary embodiment, operational systems 106 may include a propulsion system 108 for use in maneuvering aircraft 100, an environmental system 110 for use in detecting and/or controlling an environmental condition, and/or a communication system 112 for use in receiving data and/or information from a remote location (not shown). Aircraft 100 may include any number of other systems that enables aircraft 100 to function as described herein.

Figure 2:
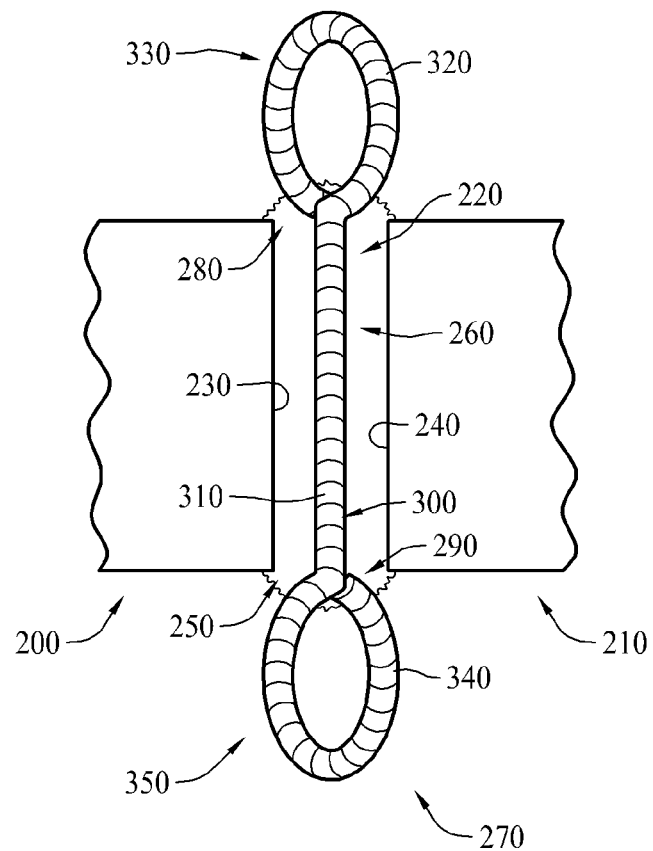
FIG. 2 is a schematic illustration of a first component and a second component that may be used with the aircraft shown in FIG. 1.

FIG. 2 is a schematic illustration of an exemplary first component 200, an exemplary second component 210, and a separation interface 220 extending therebetween. More specifically, in the exemplary embodiment, separation interface 220 extends between an outer surface 230 of first component 200 and an outer surface 240 of second component 210. In the exemplary embodiment, first component 200 is a consumable part and, as such, is a component that is periodically repaired and/or replaced. For example, first component 200 may be, without limitation, thermal protection tiles, environment access panels, and/or environment fairings. Alternatively, first component 200 may be any suitable component that enables separation interface 220 to function as described herein. In the exemplary embodiment, second component 210 is a part of airframe 102, interior 104, and/or operational systems 106 to which first component 200 is removably coupled.

In the exemplary embodiment, a layer of adhesive 250 is applied along separation interface 220 to form a bond line 260 that extends between first component surface 230 and second component surface 240. More specifically, in the exemplary embodiment, adhesive layer 250 facilitates securing first component surface 230 to second component surface 240 along bond line 260.

In the exemplary embodiment, adhesive layer 250 includes a quick-bonding material that is applied along separation interface 220 and/or that may be easily removed, when desired, from separation interface 220. Moreover, in the exemplary embodiment, the quick-bonding material has a high temperature cure requirement. For example, in one embodiment, the quick-bonding material cures at a temperature of between approximately 350° F. (177° C.) and approximately 750° F. (399° C.). Moreover, in one embodiment, adhesive layer 250 includes a quick-cure silicone adhesive such as, without limitation, SM5160 TACKY-TAPE®, commercially available from Schnee-Morehead, Inc. located in Irving, Tex. Alternatively, any suitable adhesive may be applied along separation interface 220 that enables first component 200 to function as described herein.

In the exemplary embodiment, a pull cord 270 is embedded in adhesive layer 250. In the exemplary embodiment, pull cord 270 has a first end 280, a second end 290, and a body 300 that extends therebetween. In the exemplary embodiment, at least a first segment 310 of pull cord body 300 is embedded into adhesive layer 250 along separation interface 220 and between outer surfaces 230, 240. More specifically, in the exemplary embodiment, pull cord 270 is positioned such that a shear force is applicable along bond line 260, by at least first segment 310, when pull cord 270 is pulled by a user.

In the exemplary embodiment, cord first end 280 is embedded in adhesive layer 250 such that at least a second segment 320 of body 300, adjacent to first end 280, extends externally from adhesive layer 250 and is formed in a first loop 330. Additionally, or alternatively, cord second end 290 is embedded in adhesive layer 250 such that at least a third segment 340 of body 300, adjacent to second end 290, extends externally from adhesive layer 250 and is formed in a second loop 350. In such an embodiment, second loop 350 is positioned adjacent to first loop 330 to enable a user to simultaneously grasp first and second loops 330, 350. In the exemplary embodiment, first loop 330 and/or second loop 350 is graspable to enable pull cord 270 to be pulled.

Alternatively, first end 280 and/or second end 290 is not embedded in adhesive layer 250, but rather, in such an embodiment, first end 280 and/or second end 290 extends outward from, and remains external to, adhesive layer 250. In such an embodiment, first end 280 and/or second end 290 are graspable to enable pull cord 270 to be pulled. For example, in one embodiment, first and second ends 280, 290 are positioned adjacent to each other.

In one embodiment, cord first end 280 is coupled to first component 200 at an attachment point (not shown) positioned within separation interface 220, and cord second end 290 extends outside adhesive layer 250. In such an embodiment, second end 290 may be used to rotate pull cord 270 about the attachment point to facilitate cleaving bond line 260.

In the exemplary embodiment, pull cord 270 is fabricated from a material having a high-tensile strength that enables pull cord 270 to shear through adhesive layer 250. In the exemplary embodiment, the material used in fabricating pull cord 270 has high dielectric strength, and has a low or negative coefficient of thermal expansion. For example, in one embodiment, pull cord 270 is fabricated from a multifilament yarn that was spun from a liquid crystal polymer such as, without limitation, Vectran®, commercially available from Kuraray Co., Ltd. located in Tokyo, Japan. Alternatively, pull cord 270 may be fabricated from any suitable material that enables pull cord 270 to function as described herein.

Figure 3:
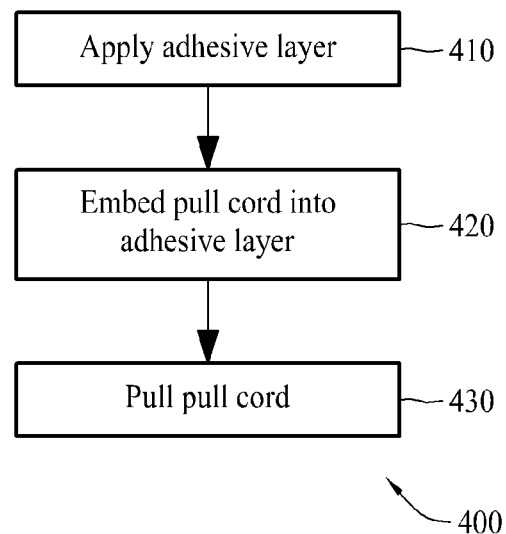
FIG. 3 is a flow chart illustrating an exemplary method that may be used to cleave a bond line of an adhesive coupling the first component to the second component shown in FIG. 2.

FIG. 3 is a flow chart illustrating an exemplary method 400 that may be used to cleave bond line 260. In the exemplary embodiment, adhesive layer 250 is applied 410 along separation interface 220 defined between outer surface 230 and outer surface 240. In one embodiment, adhesive layer 250 includes a quick-bonding material that has a high temperature cure requirement.

In the exemplary embodiment, pull cord 270 is embedded 420 into adhesive layer 250 along separation interface 220 and between outer surface 230 and outer surface 240. More specifically, in the exemplary embodiment, pull cord 270 is embedded 420 such that second segment 320 and/or third segment 340 extend externally to adhesive layer 250. That is, in the exemplary embodiment, cord first end 280 and/or cord second end 290 is embedded 420 into adhesive layer 250 such that second segment 320 and/or third segment 340 form first loop 330 and second loop 350, respectively, extending outside adhesive layer 250. Accordingly, second segment 320 and/or third segment 340 are graspable and/or are readily accessible to a user. Alternatively, cord first end 280 and/or cord second end 290 may be positioned such that first and second ends 280, 290 are simultaneously pullable. For example, in one embodiment, cord first end 280 is positioned adjacent to cord second end 290. In the exemplary embodiment, pull cord 270 has a high dielectric strength, and a low or negative coefficient of thermal expansion.

In the exemplary embodiment, pull cord 270 is positioned to enable separation interface 220 to be cleaved such that first component 200 is uncoupled from second component 210. More specifically, in the exemplary embodiment, second segment 320 and/or third segment 340 may be used 430 to facilitate cleaving bond line 260 at separation interface 220. That is, in the exemplary embodiment, second segment 320 and third segment 340 are simultaneously pulled 430 to apply a shear force along bond line 260. In the exemplary embodiment, the shear force initiates a failure of the adhesive bond between first and second component surfaces 230 and 240.

The above-described embodiments enable consumable parts to be quickly coupled and uncoupled from a system. More specifically, the embodiments described herein include a pull cord that enables a bond line between a consumable part surface and a system surface to be cleaved. The pull cord enables the consumable part to be quickly uncoupled from the system such that a replacement consumable part may be quickly coupled to the system. As such, the embodiments described herein facilitate decreasing time a system is out of commission.

Exemplary embodiments of systems and methods for removably coupling consumable parts are described above in detail. The systems and methods are not limited to the specific embodiments described herein, but rather, components of systems and/or steps of the method may be utilized independently and separately from other components and/or steps described herein. Each component and each method step may also be used in combination with other components and/or method steps. Although specific features of various embodiments may be shown in some drawings and not in others, this is for convenience only. Any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of coupling a thermal protection tile having a first surface to a second component having a second surface oppositely facing the first surface, said method comprising:
    applying a layer of adhesive along a separation interface defined between the first surface and the second surface, wherein the layer of adhesive is formed from a quick-cure silicone-based material that cures at a temperature range of between approximately 350° F. (177° C.) and approximately 750° F. (399° C.);
    embedding a pull cord into the adhesive layer along the separation interface and between the first and second surfaces;
    extending a first end of the pull cord from the adhesive layer at a first end of the separation interface; and
    extending a second end of the pull cord from the adhesive layer at a second end of the separation interface opposite the first end;
    whereby upon pulling the first and second ends of the pull cord simultaneously in a direction parallel to the separation interface, the pull cord cleaves the adhesive layer along a bond line through the separation interface such that portions of residual adhesive remain coupled to both the first surface and the second surface.

2. A method in accordance with claim 1, wherein embedding a first portion of a pull cord further comprises embedding the first portion of the pull cord into the adhesive layer, wherein the pull cord is fabricated using a liquid crystal polymer.

3. A method in accordance with claim 1, wherein embedding a first portion of a pull cord further comprises embedding the first portion of the pull cord into the adhesive layer, wherein the pull cord has a negative coefficient of thermal expansion.

4. A method in accordance with claim 1 further comprising looping a first segment of the first end of the pull cord, wherein the first segment is embedded into the adhesive layer such that the first segment extending from the adhesive layer forms a first loop.

5. A method in accordance with claim 1 further comprising positioning a first end of the pull cord adjacent to a second end of the pull cord.

6. A method in accordance with claim 1 further comprising coupling at least a portion of the pull cord to the first component, wherein the thermal protection tile is a consumable part that wears out over time and necessitates replacement faster than the second component.

7. A system comprising:
    a thermal protection tile having a first surface;
    a second component having a second surface oppositely facing the first surface, wherein a separation interface is defined between said first surface and said second surface;
    a layer of adhesive applied along the separation interface, wherein the layer of adhesive is formed from a quick-cure silicone-based material that cures at a temperature range of between approximately 350° F. (177° C.) and approximately 750° F. (399° C.); and
    a pull cord comprising:
        a first portion embedded into said adhesive layer along the separation interface and between said first and second surfaces;
        a first end extending from the adhesive layer at a first end of the separation interface; and
        a second end extending from said adhesive layer at a second end of the separation interface opposite the first end;
        whereby upon pulling the first and second ends of the pull cord simultaneously in a direction parallel to the separation interface, the pull cord cleaves the adhesive layer along a bond line through the separation interface such that portions of residual adhesive remain coupled to both the first surface and the second surface.

8. A system in accordance with claim 7, wherein said pull cord is fabricated using a liquid crystal polymer and has a negative coefficient of thermal expansion.

9. A system in accordance with claim 7, wherein said first end comprises a first segment and a second segment, said first segment embedded into said adhesive layer such that said second segment extending outside of said adhesive layer forms a first loop.

10. A system in accordance with claim 7, wherein said second end is positioned adjacent to said first end.

11. A system in accordance with claim 7, wherein at least a portion of said pull cord is coupled to said thermal protection tile, wherein said thermal protection tile is a consumable part that wear out over time and necessitates replacement faster than said second component.

* * * * *

UNITED STATES PATENT AND TRADEMARK OFFICE
CERTIFICATE OF CORRECTION

| | | |
|---|---|---|
| PATENT NO. | : 9,249,340 B2 | Page 1 of 1 |
| APPLICATION NO. | : 13/092605 | |
| DATED | : February 2, 2016 | |
| INVENTOR(S) | : Terry A. Sewell et al. | |

It is certified that error appears in the above-identified patent and that said Letters Patent is hereby corrected as shown below:

In the claims,

In Claim 5, Column 6, Lines 15, delete "positioning a first", and insert therefor --positioning the first--.

In Claim 5, Column 6, Lines 15, delete "to a second", and insert therefor --to the second--.

In Claim 6, Column 6, Lines 18-19, delete "first component", and insert therefor --thermal protection tile--.

Signed and Sealed this
Nineteenth Day of April, 2016

Michelle K. Lee
*Director of the United States Patent and Trademark Office*